(12) United States Patent
Rettberg (10) Patent No.: US 12,319,886 B2
(45) Date of Patent: Jun. 3, 2025

(54) SYSTEM AND METHOD FOR REDUCING FRICTION, TORQUE AND DRAG IN ARTIFICIAL LIFT SYSTEMS USED IN OIL AND GAS PRODUCTION WELLS

(71) Applicant: Scott Rettberg, Laguna Hills, CA (US)

(72) Inventor: Scott Rettberg, Laguna Hills, CA (US)

(73) Assignee: AMERICAN WELL TECHNOLOGY HOLDINGS, LLC, Gardendale, TX (US)

( * ) Notice: Subject to any disclaimer, the term of this patent is extended or adjusted under 35 U.S.C. 154(b) by 0 days.

(21) Appl. No.: 17/660,771

(22) Filed: Apr. 26, 2022

(65) Prior Publication Data

US 2022/0251464 A1  Aug. 11, 2022

Related U.S. Application Data

(63) Continuation of application No. 16/666,267, filed on Oct. 28, 2019, now Pat. No. 11,345,871, which is a
(Continued)

(51) Int. Cl.
*C10M 105/24* (2006.01)
*C10M 125/14* (2006.01)
(Continued)

(52) U.S. Cl.
CPC ........ *C10M 105/24* (2013.01); *C10M 125/14* (2013.01); *C10M 173/00* (2013.01);
(Continued)

(58) Field of Classification Search
CPC .............. C10M 105/24; C10M 125/14; C10M 173/00; C10M 2207/401; F04B 39/02; F16N 15/00
See application file for complete search history.

(56) References Cited

U.S. PATENT DOCUMENTS 3,661,784 A * 5/1972 Bellos .................. C10M 133/08
252/392
3,751,364 A  8/1973 Bellos
(Continued)

FOREIGN PATENT DOCUMENTS

CN  1912443 A  2/2007
CN  106281594 A  1/2017
(Continued)

OTHER PUBLICATIONS

Thomas, Shane, "The International Search Report and The Written Opinion of the International Searching Authority," Patent Cooperation Treaty (PCT), Mar. 26, 2018, 10 pages, PCT Application No. PCT/US2018/015586, Alexandria, USA.

*Primary Examiner* — James C Goloboy
(74) *Attorney, Agent, or Firm* — DANE IP Law PC (57) ABSTRACT

A method of lubricating a fluid production pump may include mixing a polarized lubricant with water to produce a diluted lubricant. The method may additionally include creating a flowpath within the fluid production pump. An initial volume of the diluted lubricant may be circulated within the flowpath to allow the diluted lubricant to react with components of the fluid production pump and form a protective barrier on the components of the fluid production pump. The method may further comprise repeatedly introducing a periodic volume of diluted lubricant into the fluid production pump according to a predefined lubrication schedule.

6 Claims, 4 Drawing Sheets

Related U.S. Application Data continuation of application No. 15/880,439, filed on Jan. 25, 2018, now abandoned.

(60) Provisional application No. 62/581,610, filed on Nov. 3, 2017, provisional application No. 62/451,071, filed on Jan. 27, 2017.

(51) Int. Cl.
*C10M 173/00* (2006.01)
*F04B 39/02* (2006.01)
*F16N 15/00* (2006.01)

(52) U.S. Cl.
CPC .............. *F04B 39/02* (2013.01); *F16N 15/00* (2013.01); *C10M 2207/401* (2013.01)

(56) References Cited

U.S. PATENT DOCUMENTS

| | | |
|---|---|---|
| 4,806,256 A | 2/1989 | Rose |
| 4,963,280 A | 10/1990 | Wilkins |
| 5,318,956 A | 6/1994 | Mueller |
| 5,380,469 A | 1/1995 | Flider |
| 5,633,220 A | 5/1997 | Cawiezel |
| 6,109,790 A | 8/2000 | Von Gynz-Rekowski |
| 6,557,651 B1 | 5/2003 | Norby |
| 11,873,946 B2 | 1/2024 | Rettberg |
| 2003/0041929 A1 | 3/2003 | Beck |
| 2003/0209441 A1 | 11/2003 | Brocke |
| 2004/0214734 A1* | 10/2004 | King .................... C10M 173/00 508/491 |
| 2005/0003971 A1 | 1/2005 | Torchia |
| 2006/0270569 A1 | 11/2006 | Athans |
| 2009/0050827 A1 | 2/2009 | Takahashi |
| 2010/0093568 A1* | 4/2010 | Tagawa .............. C10M 171/008 508/459 |
| 2010/0323932 A1 | 12/2010 | Bustos |
| 2012/0088698 A1 | 4/2012 | Kayser |
| 2014/0220083 A1 | 8/2014 | Brito |
| 2017/0362490 A1* | 12/2017 | Van Slyke ........... C10M 107/02 |
| 2018/0216022 A1 | 8/2018 | Rettberg |
| 2019/0137035 A1 | 5/2019 | Rettberg |
| 2020/0032630 A1 | 1/2020 | Artinian |
| 2020/0056112 A1 | 2/2020 | Rettberg |
| 2021/0356078 A1 | 11/2021 | Rettberg |
| 2024/0110668 A1 | 4/2024 | Rettberg |

FOREIGN PATENT DOCUMENTS

| | | |
|---|---|---|
| WO | 9305129 A1 | 3/1993 |
| WO | 2013078374 A1 | 5/2013 |

* cited by examiner

SYSTEM AND METHOD FOR REDUCING FRICTION, TORQUE AND DRAG IN ARTIFICIAL LIFT SYSTEMS USED IN OIL AND GAS PRODUCTION WELLS

CROSS-REFERENCE TO RELATED APPLICATIONS

This application is a continuation application of U.S. patent application Ser. No. 16/666,267, filed on 2019 Oct. 28, which is a continuation application of U.S. patent application Ser. No. 15/880,439, filed on 2018 Jan. 25, which claims priority to U.S. Provisional Application No. 62/451,071, filed 2017 Jan. 27, and U.S. Provisional Application No. 62/581,610, filed 2017 Nov. 3, the contents of which are expressly incorporated herein by reference.

STATEMENT RE: FEDERALLY SPONSORED RESEARCH/DEVELOPMENT

Not Applicable

BACKGROUND

1. Technical Field

The present disclosure relates generally to lubrication, and more specifically to a diluted polarized lubricant and a related method of use for lubricating industrial pumps, such as pumps used for oil and gas production.

2. Description of the Related Art

Artificial lift systems (ALS) are commonly used to pump production fluid from oil and gas producing wells. Such lift systems tend to be inefficient which may result in higher energy consumption and lost production.

Accordingly, there is a need in the art for a new device or method of use which increases efficiency. Various aspects of the present disclosure address this particular need, as will be discussed in more detail below.

BRIEF SUMMARY

Various aspects of the present disclosure relate to a lubricant and a method of using the lubricant to reduce drag, friction, and torque in oil and gas producing pumps.

Such pumps may include components such as sucker rods and tubing which are subject to wear during operation. Wear may lead to inefficient production, higher energy consumption, and lost production caused by less than optimal run speeds. Furthermore, in the event of component failure, such components may be expensive and repair and replacement may be very time consuming. These issues may have previously stemmed from a lack of a sufficient lubricant solution for down hole oil and gas production systems which addresses performance, pump efficiency, longevity, or limited production capability due to the friction of rod-on-tubing contact points, motor torque, and drag in Artificial Lift Systems, or the problem of excessive wear and premature failure of production system components. In many other mechanical systems, metal contact points may be continually lubricated to address performance and longevity or failure issues. However, in oil production well operations, excessive friction, torque, and drag may reduce production volumes, and in some cases, cause pump inefficiencies and performance issues. Friction, torque and/or drag may create excessive wear on components of oil production well systems, and consequently, may increase the cost of ownership and operation through premature wear, failure, replacement, and lost production related to downtime and increased energy costs of operation. These problems may affect all major types of Artificial Lift Systems, including progressing cavity pumps, electronic submersible pumps, rod lifts or sucker-rod pumps, and various surface pumps used to move gas condensate, salt water disposal, and other fluids.

Accordingly, various aspects of the present disclosure are directed toward a lubricant and a method of use, which may be used with Artificial Lift Systems to address one or more of the issues noted above.

According to one embodiment, there may be provided a method of lubricating a fluid production pump. The method may include mixing a polarized lubricant with water to produce a diluted lubricant. The method may additionally include creating a flowpath within the fluid production pump. An initial volume of the diluted lubricant may be circulated within the flowpath to allow the diluted lubricant to react with components of the fluid production pump and form a protective barrier on the components of the fluid production pump. The method may further comprise repeatedly introducing a periodic volume of diluted lubricant into the fluid production pump according to a predefined lubrication schedule.

The creating step may include creating a closed loop flowpath within the fluid production pump.

The method may also include the steps of undoing the closed loop flowpath from the fluid production pump after the circulating step, and creating a serial flowpath through the fluid production pump before the operating step.

The method may further comprise the step of disposing the initial volume of the diluted lubricant within the flowpath. The mixing step may be performed before the disposing step.

The initial volume in the circulating step may be larger than the periodic volume in the repeating step.

The method may additionally include the step of calculating a ratio of polarized lubricant to water based on a daily production volume of the fluid production pump.

The mixing step may include producing a diluted lubricant having a ratio of water to polarized lubricant in a range of 1:1-13:1.

The polarized lubricant in the mixing step may include a plant based fluid. The polarized lubricant in the mixing step may include an emulsifier. The polarized lubricant in the mixing step may include a petroleum based fluid.

The method may further comprise the step of operating the fluid pump between the circulating step and the repeatedly introducing step.

The method may include filling a scratch formed in the protective barrier with the periodic volume of diluted lubricant. The method may additionally include increasing coverage of the protective barrier on the components of the fluid production pump.

According to another embodiment, there may be provided a method of reducing friction in a fluid production pump. The method may include circulating a diluted lubricant through the fluid production pump to allow the diluted lubricant to be attracted to the fluid production pump and components thereof via a positive ion charge of the diluted lubricant.

The method may additionally include the step of repeatedly introducing additional diluted lubricant through the fluid production pump according to a predefined lubrication schedule.

According to another embodiment, there may be provided a diluted lubricant for a fluid production pump. The diluted lubricant may include a polarized lubricant formed from a plant based fluid and including an emulsifier, and water. A ratio of water to polarized lubricant may be in the range of 1:1-13:1.

The plant based fluid may include one of: grape seed oil, canola oil, sunflower oil, and soybean oil.

The polarized lubricant may be of an ionic positive charge.

The diluted lubricant may additionally include a lubricity additive and/or a friction reducer.

The ratio of water to polarized lubricant may be in the range of 4:1-10:1.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of certain embodiments of a diluted lubricant for use with oil and gas production wells, and a related method of use, and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Various aspects of the present disclosure relate to a method of creating a lubricant for use in industrial pumps, such as a variety of oil and gas production artificial lift systems (ALS) used to pump production fluids from oil and gas producing wells. The lubricant may be created by adding water to a polarized lubricant to volumize the lubricant, and thus, achieve cost savings, particularly when used on a large scale. The polarity of the lubricant may allow positive ions in the lubricant to be attracted to free ions on the pump equipment to form a protective barrier film on the pump equipment. In other words, the lubricant does not simply coat the pump equipment; rather, the polar attraction between the polarized lubricant and the pump equipment creates a force which binds the lubricant to the pump equipment. The treatment of lubricating the pump equipment with the lubricant may generally include a two-step process, wherein the first step involves an initial treatment of the pump equipment with the lubricant, and the second step involves repeated periodic treatment of the pump equipment with the lubricant. Lubricating the pump in this manner may reduce friction, torque, and drag experienced in the pump, and thus prolong the life of the pump and allow the pump to operate more efficiently, e.g., more product may be pumped using less power. The reduction of rod-on-tubing coefficient of friction, motor torque, and/or drag in various ALS systems including, but not limited to, conventional rod pumps, progressing cavity pumps, electronic submersible pumps, and a variety of surface pump types creates a positive change in key performance indicators. Furthermore, the thin film protective barrier formed on the pump equipment may also serve as an inhibitor of corrosion, scale formation, and paraffin formation on the pump equipment.

According to one embodiment, the lubricant used for treating the pump is a diluted lubricant generally comprised of a polarized lubricant (e.g., a concentrate) and water. An exemplary polarized lubricant is PROFLOW™ sold by ProOne, Inc., Costa Mesa, CA. However, it is understood that the scope of the present disclosure is not intended to limit the term polarized lubricant to PROFLOW™, and other polarized lubricants known in the art may also be used. According to one implementation, the polarized lubricant is formed of hydrotreated mineral oil, synthetic fluids and polymers, hydrocarbon distillates, and additives. In one exemplar weight percentage of the concentrate polarized lubricant, the hydrotreated mineral oil comprises more than 45% of the weight percentage of the polarized lubricant, the synthetic fluids and polymers comprise less than 15% of the weight percentage of the polarized lubricant, the hydrocarbon distillates comprise less than 10% of the weight percentage of the polarized lubricant, and the additives comprise less than 10% of the weight percentage of the polarized lubricant.

The polarized lubricant may include natural vegetable oils, emulsifiers, and other constituents that produce a positively charged molecule structure with a strong positive ionic (+) charge, which is attracted to metal surfaces for bonding to the metal surfaces. The emulsifiers within the polarized lubricant may allow the water and polarized lubricant to mix and not separate from each other so as to allow for the volumizing of the polarized lubricant. As such, the polarized lubricant may be generally evenly mixed in the water. The natural vegetable oils may include grape seed oil, canola oil, sunflower oil, soybean oil, among others, and may serve as the base oil of the polarized lubricant, which also serves to provide lubrication benefits. It is also contemplated that in another embodiment, the polarized lubricant may include a petroleum based fluid.

The polarized lubricant is mixed with water to produce the diluted lubricant. It is contemplated that a ratio of water to polarized lubricant may vary from 1:1-13:1 in one embodiment. The amount of water added to the polarized lubricant may vary depending on the type of pump which is being treated. For instance, it is contemplated that treatment may be performed on electronic submersible pumps, as well as rod pumps. For electronic submersible pumps, the ratio of water to polarized lubricant may be 3:1-7:1, and more preferably 5:1. In the case of rod pumps, the ratio of water to polarized lubricant may be 4:1-8:1, and more preferably 6:1.

The amount or volume of diluted lubricant that is created for a given lubrication treatment may be based on the water portion (i.e., the "water cut") of the total well production fluid volume for the associated well. In other words, when production fluid is pumped from the well, the production fluid will include portion which is water, with the volume of the water pumped from the well serving as the basis upon which the volume calculation of the diluted lubricant is made. According to one embodiment, the volume of diluted lubricant required for a given treatment may be referred to in terms of a percentage of the water cut, and in one particular embodiment, a parts per million (PPM), e.g., X/1,000,000, of the water cut. In one implementation, the treatment volume of the diluted lubricant may be in the range of 100 PPM-5000 PPM of the water cut (e.g., 100/1,000,000-5,000/1,000,000), while in another implementation, the treatment volume may be in the range of 250 PPM-3800 PPM of the water cut, while in yet another embodiment, the treatment volume may be in the range of 400 PPM-2600 PPM of the water cut. Some factors which may impact the treatment volume are the formation of the well (e.g., the geology in which the well is located), the downhole chemistries, and the API or gravity of the oil.

For example, a given well may be producing a production fluid comprised of 50% oil and 50% water. If the well is producing 400 barrels (bbls) of production fluid per day, the amount of diluted lubricant created would be based on 200 bbls of water, which is equivalent to 8400 gallons of water (i.e., 1 bbl=42 gallons). For the range of 100 PPM-5000 PPM, based on 8400 gallons of water, the amount of diluted lubricant would be 0.84 gallons-42 gallons.

It is contemplated that the calculation of the volume of diluted lubricant may be calculated from past data relating to water cut. However, the calculations may change after treatment begins, and pump efficiency increases, thereby resulting in an increase in production fluid pumped from the well. It is additionally contemplated that the calculation of the volume of diluted lubricant may be calculated from the total production volume, which would be equal to approximately 50% of the production based on the water cut, or alternatively, the calculation may be based on the oil amount, which may be substantially equal to calculations based on the water cut.

Figure 3:
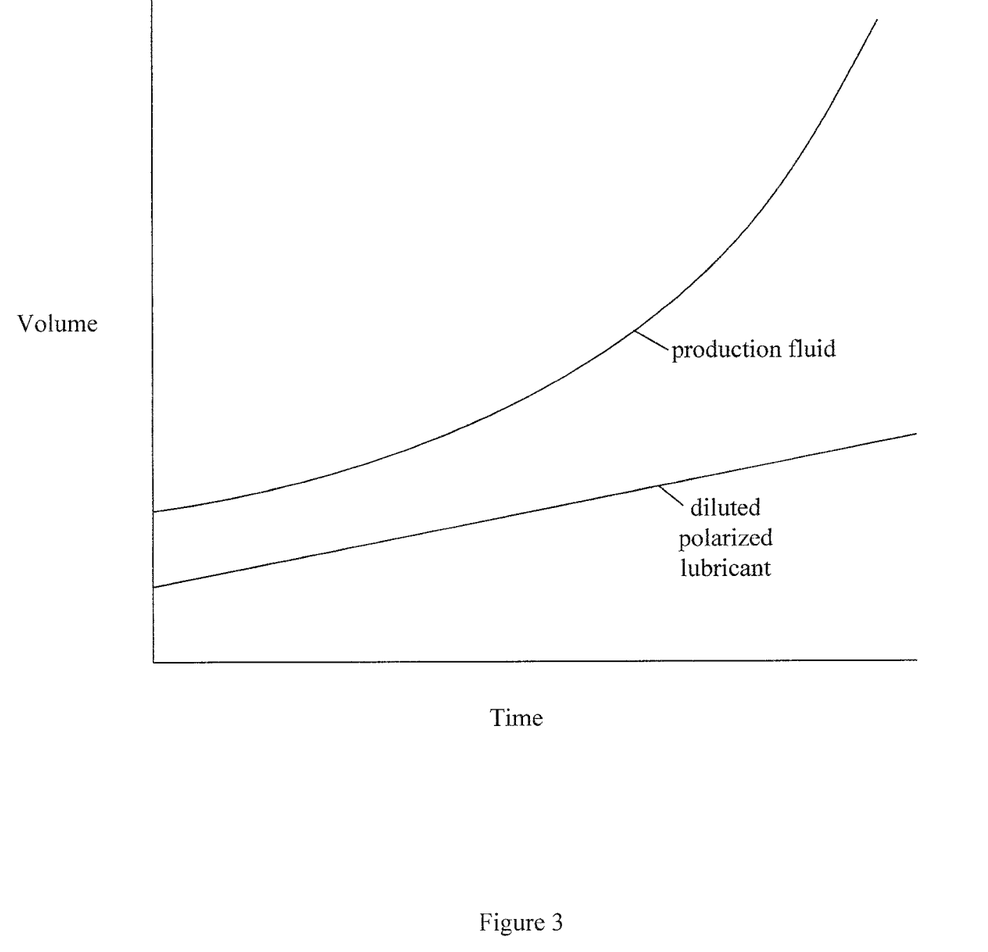
FIG. 3 is a graph showing a relationship between volume of production fluid and volume of diluted lubricant.

The relationship between the volume of diluted lubricant needed for a given lubrication treatment is one such that as the volume of the production fluid increases, the parts per million of the diluted lubricant decreases. As such, and referring now to FIG. 3, as the volume of production fluid increases, the volume of the diluted lubricant may be a smaller percentage of the water cut, although there may be an increase in total volume. Accordingly, the lower ends of the PPM ranges provided above may be associated with higher production amounts, whereas the upper ends of the PPM ranges provided above may be associated with lower production amounts. For instance, a well producing 100 barrels of oil per day may require a diluted lubricant that is 1200 PPM of the water cut, whereas a similar well producing 1000 barrels of oil per day may require a diluted lubricant that is 300 PPM of the water cut.

According to one embodiment, once the diluted lubricant is mixed or created, the diluted lubricant may be introduced into the pump to lubricate the pump according to a two-stage treatment process, including an initial treatment and a periodic treatment, e.g., a daily treatment.

Figure 1:
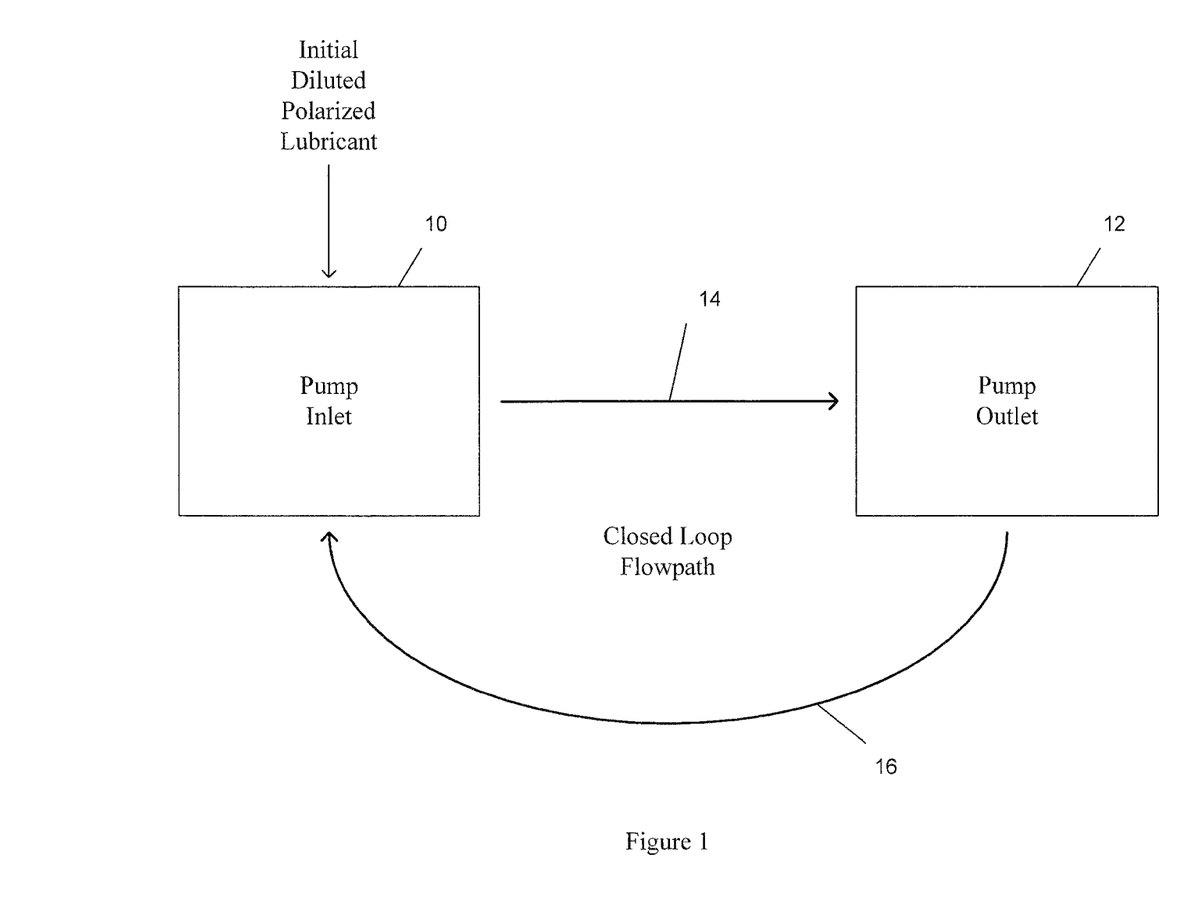
FIG. 1 is a schematic view of closed loop flowpath for recirculating a diluted polarized lubricant within an oil production pump during an initial lubrication treatment.

With regard to the initial treatment, a closed loop flowpath may be created within the pump. In one embodiment, the closed loop flowpath may be created by utilizing a u-tube to connect the exit line of the pump with the feed line of the pump. A schematic example of the closed loop flowpath is shown in FIG. 1, which shows pump inlet 10 and pump outlet 12. Arrow 14 represents typical flow through the pump from the pump include 10 to the pump outlet 12, while arrow 16 represents a recirculation tube, which recirculates fluid from the pump outlet 12 to the pump inlet 10.

During the initial treatment, an initial volume of diluted lubricant is introduced into the pump, with the pump being turned off. The diluted lubricant may be introduced within the pump using a pumper, roper, treater truck, or an automated injector pump, which may include a timer which actuates the injector pump to pump diluted lubricant from a reservoir or tank which is fluidly connected to the injector pump. Thus, the automated injector pump may allow for introduction of diluted lubricant according to a present lubrication schedule independent of operator input. It is also contemplated that the diluted lubricant may be pre-installed in the pump, in the case of a new pump, or if certain components of the pump are being replaced, those components may be pre-loaded with the diluted lubricant. In this regard, the scope of the present disclosure contemplates adding diluted lubricant to the pump, on-site.

Once the closed loop flowpath is created, the pump is turned on to allow for continual recirculation of the diluted lubricant within the pump. During recirculation, the diluted lubricant passes over the components of the oil production pump and the positive ions in the diluted lubricant are attracted to the free ions on the exposed surfaces of the metal components of the oil production pump such that the lubricant is attracted to the components and may bind to the components to form a protective film on the components. The components of the pump that may interact with the lubricant may include the rod(s), tube(s), conduit(s), elastomer parts, or any component having an exposed metal surface in the flowpath of the pump. According to one embodiment, the pump runs for 1-24 hours, while in another embodiment, the pump runs for 2-12 hours, while in another embodiment the pump runs for approximately 2-4 hours to allow for sufficient lubrication of the components of the pump. The duration of the recirculation may depend on the size of the pump or the type of pump. During the recirculation period, the diluted lubricant may mix with the production fluid and form a substantially complete radial coating of thin bonding lubricant film to metal surfaces of the pump components. The film that forms on the pump components may not only function as a lubricant, but may also function to inhibit corrosion of the pump components, as well as to inhibit scale/solid deposition formation on the pump components, in addition to inhibiting paraffin formation on the pump components. In this regard, corrosion may be inhibited by covering the metal surface of the pump components to prevent the metal surfaces with reacting with chemicals which would otherwise lead to corrosion. Scale or paraffin formation may be inhibited by creating a smooth, slippery surface to which scale and paraffins may not be able to attach.

The pump is then temporarily shut down, and the exit line is restored to normal configuration. In other words, the closed loop flowpath is undone by removing the return tube (represented by arrow 16) directing flow from the pump outlet 12 to the pump inlet 10. The pump may then be turned back on and the pump resumes normal production.

After the initial treatment has been completed on a given pump, periodic treatment may be recommended for restorative benefits. The periodic treatment may entail repeatedly introducing diluted lubricant into the pump according to a predefined lubrication schedule. According to one embodiment, the predefined lubrication schedule is one which includes a daily lubrication of the pump, but may also include lubrication every other day, or some other non-daily basis, or alternatively, a schedule in which lubrication occurs more than once a day.

It is contemplated that the water-to-lubricant ratio for the diluted lubricant used in the periodic treatment may vary from the water to lubricant ratio used for the initial treatment. For instance, the diluted lubricant may be more dilute or less dilute than the diluted lubricant used in the initial treatment. In one example, the volume of diluted lubricant in the initial treatment may be in the range of 280-600 gallons, while the volume of diluted lubricant in the periodic treatment may be in the range of 7-50 gallons.

Figure 2:
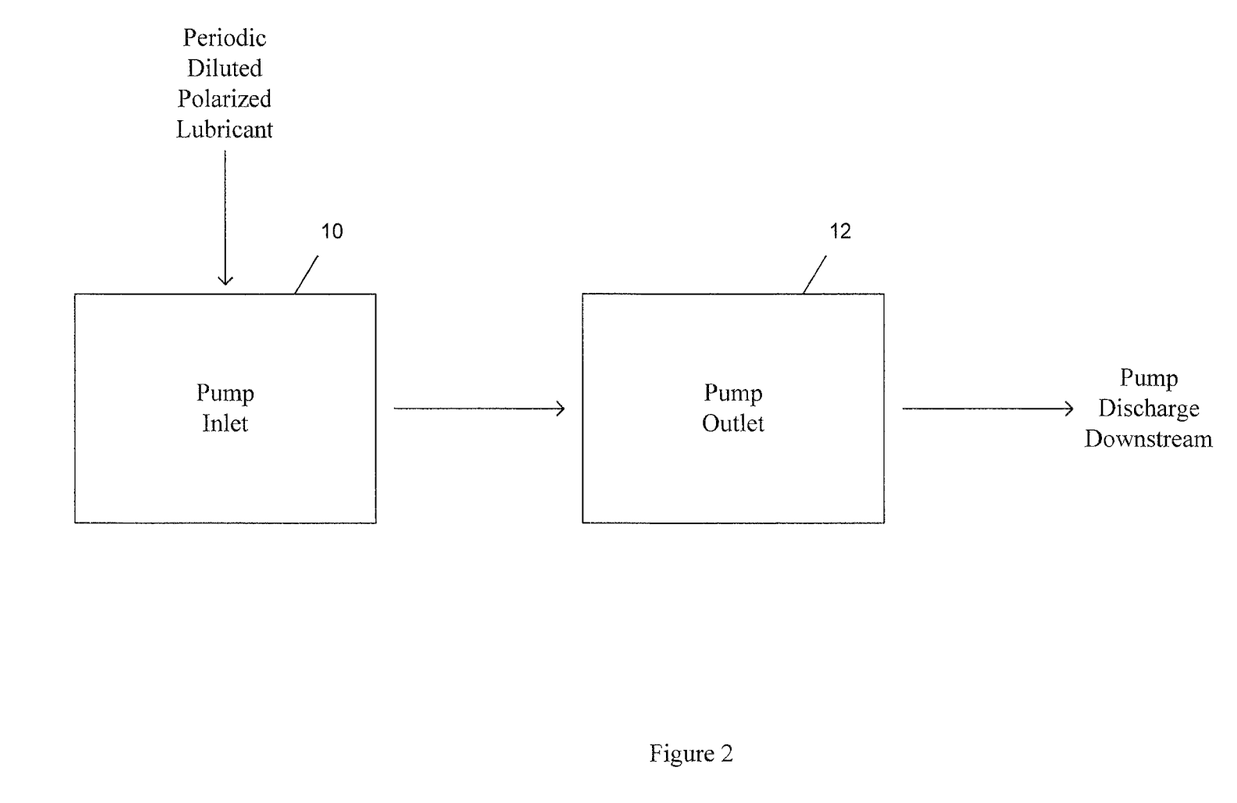
FIG. 2 is a schematic view of a flowpath for passing a diluted polarized lubricant through the oil production pump during a periodic lubrication treatment.

FIG. 2 shows a schematic diagram of the pump configuration for periodic treatment. In this respect, diluted polarized lubricant may be introduced into the pump inlet 10, flow through the pump, and exit via the pump outlet 12. According to one embodiment, the volume of diluted lubricant used in a single periodic treatment is fed into the pump in one dose over a 4-5 minute period. When the diluted lubricant flows through the pump during the periodic treatment, the diluted lubricant may return the thin film protective barrier to approximately 100% coverage over the pump components. In this regard, after the initial treatment, as production fluid passes through the pump, particulates within the production fluid may form scratches or abrasions within the thin film protective barrier. Thus, the periodic treatment allows the diluted lubricant to fill in those scratch or abrasions to increase the coverage of the thin film protective barrier.

Figure 4:
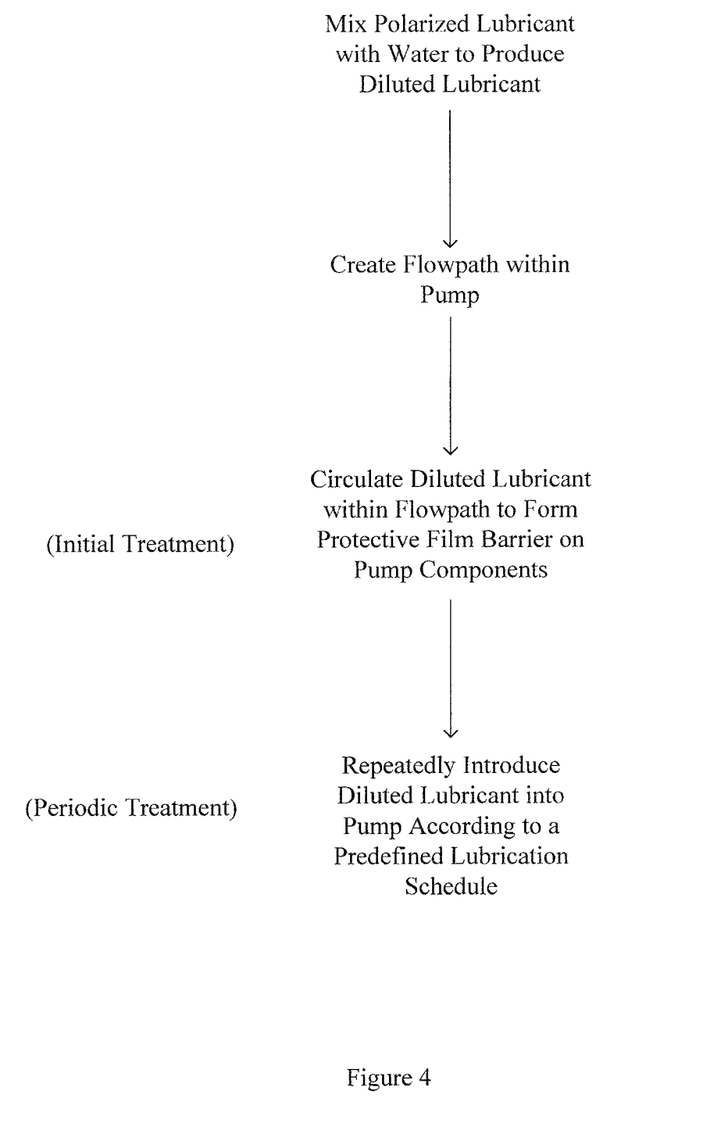
FIG. 4 is a flow chart outlining steps in an exemplary method of lubricating a pump.

The lubrication methodology described herein, and shown in the flowchart depicted in FIG. 4 may increase pump performance, operating efficiency, and longevity in oil and gas production wells that may be hampered by excessive friction caused by metal-to-metal (e.g., rod-on-tubing) contact of production system components and/or metal-to-nonmetallic components, such as stators and seals, motor torque, and rod load due to friction induced drag. Reductions of the coefficient of friction, drag, and/or torque may create positive changes in pump behaviors known as Key Performance Indicators, including but not limited to reduction in rod load, flow line pressures, running hours, energy consumption, failure occurrences, increase in pump operating speeds, production volumes, annular gas flow, longevity of well and pump components, and pump efficiency.

Test Data

Various embodiments of the lubrication treatment were used in several tests, which resulted in improved operation of the tested pump, as explained below.

Test #1—Progressing Cavity (PC) Pump Test

This test was conducted on a larger PC Pump having lower operating speeds (approximately 108 RPM) prior to testing due to high torque on the top drive. The starting torque was about 1,175 Foot Pounds of Torque (FPT) with a control unit that auto shuts off at a level of 1250 FPT. After the treatment protocols were initiated, the torque was reduced to 770 FPT and the pump motor speed was able to be increased to 210 RPM, while still operating under 1,100 FTP.

The treatment procedure entailed mixing 165 gallons of polarized lubricant with 9 parts water to create the diluted lubricant. The well was shut down, and the production line was hose fed back into the well or U-Tubed to provide re-circulation. The diluted lubricant was introduced down the suction side or back side of the production tubing, or fluid path, by a large pump truck using a pump at 1200 psi pushing the diluted lubricant to the production zone. The well was turned back on and forced to re-circulate for 24 hours, mixing the diluted lubricant with the production fluid, and performing a substantially full and radial coating of thin bonded lubricant film to metal surfaces. The well was then shut off, the hoses were removed, and the production line re-opened and the well turned back on line again.

The positive changes resulting from the procedure were as follows: (1) Top Drive torque dropped from 1,175 FPT to 800 FPT; (2) Pump Speeds increased from 125 RPM to 210 RPM; (3) Top Drive Torque held at 1,100 FPT during increased RPM's of pump; and (4) Production Volume was increased.

Test #2—Progressing Cavity Pump Test

This test was conducted on a pump that was inhibited in production speed and volume due to high surface drive torque and a high amperage load on the well (i.e., approximately 940 foot pounds of torque at the surface drive and 48 amps on the pump motor, limiting the pump's operating speed to approximately 116 rpm). The pump was being repaired the day before treatment testing began and had previously failed several times in the previous 90 days. After treatment protocols were followed, the torque was reduced by 23% to 720 FPT and the amps were reduced by 25% to 36 AMPS, allowing the RPM's on the pump to be increased to 250 RPM's. Daily treatment was followed for 30 days, in which time all positive changes in key performance indicators were held. When the test terminated and treatment was stopped, all of the positive changes were lost within a period of 48 hours, and the pump returned to its pre-test levels of torque and energy consumption, requiring the operator to reduce the operational speeds again.

The treatment procedure included mixing 150 gallons of polarized lubricant with 10 parts water to create the diluted lubricant. The well was shut down, and the well was pulled. Test operators filled the tubing with treatment lubricant fluid just before the rod was re-installed in the tubing to create some saturation before the circulation phase. The well was turned back on and forced to re-circulate for 4 hours, mixing the lubricant with the production fluid, and performing a full and radial coating of thin bonded lubricant film to metal surfaces, and elastomer parts. The production line was re-opened and the well turned back on line again. Daily treatments of 60 gallons of diluted lubricant fluid were introduced as one batch treatment every 24 hours.

The positive changes resulting from the procedure were as follows: (1) Surface drive torque was reduced by 220 FPT or 23%; (2) Motor amps were reduced by 12 amps or 25%; (3) Flowline pressure was reduced by 24 psi; and (4) No failures during the 30-day test.

Test #3—Surface Progressing Cavity Pump Test

This test was conducted on Progressing Cavity (PC) surface pumps to transfer gas condensation through piping from large chillers that cool the gas down and then pump the gas downstream to a scrubbing or filtration center. Gas condensate has a high petroleum content that may quickly dry out the rubber/composite stator in the surface PC pumps used in the process. In the initial treatment, 5 gallons of the polarized lubricant was mixed with water and was introduced each day via a drip system. Results indicated that the mixture restored lubricity in the stator of the PC pumps. The mixture acted as a conditioner and lubricator in the elastomer parts of the stators and seals. Once treatment began the operation of the pump became stable, efficient, and produced less squelch sounding noise, and the improved operating behavior and sustained for the 30-day trail period without failure. After the test was terminated, the pump failed within 36 hours.

The treatment procedure entailed pouring 1 gallon of polarized lubricant (i.e., the lubricant concentrate, not the diluted lubricant) directly into the surface pump. A check valve and drip line was set up, and 5 gallons a day of polarized lubricant fluid was continuously fed into the pump.

The positive changes in Key Performance Indicators were as follows: (1) surface drive torque was reduced and vibration was significantly mitigated; (2) Heat signature dropped by 15 degrees Fahrenheit; (3) Flowline pressure was reduced by 12 psi; (4) No failures during the 30 day test; and (5) Improvement in operating behavior.

Test #4—Progressing Cavity Pump Test

This test was conducted on a well that was a high performing PC well, continuously running at 330 RPM's (i.e., running 24 hours a day, 7 days a week) and almost at max capacity. The Key Performance Indicators (KPI's) of torque, surge, and energy consumption were all reduced immediately after treatment protocols, and there was also a marginal increase in production volume. Dramatic decreases in Daily Peak Torque, motor torque, current torque, and surge were all recorded by the operator's automated well monitoring system. This well also realized a reduction of 2.8 KW or 13% in energy consumption for the entire test period, and then returned to its previous behavior within 30 hours of the test termination.

The treatment procedure included mixing 105 gallons of polarized lubricant with 9 parts water to create the diluted lubricant. The production line was U-Tubed to provide treatment circulation. Treatment fluid was introduced down the suction side or back side of the production tubing by a large pump truck using a pump at 1400 psi pushing the treatment lubricant fluid to the production zone. The well was turned back on and forced to re-circulate for 8 hours mixing the lubricant with the production fluid, and performing a full and radial coating of thin bonded lubricant film to all metal surfaces. The well was then shut off, the production line re-opened and the well turned back on line again. Daily treatments of 5 gallons of polarized lubricant were introduced with water as a one batch treatment every 24 hours.

The positive changes in Key Performance Indicators were as follows: (1) Daily Peak Torque dropped from 620 FPT to 535 FPT—a 14% decrease; (2) Motor Average Torque dropped from 123 FPT to 116 FPT, a 5% decrease; (3) Kilo Watt Hours were reduced by 2.8, or 13%; and (4) Flow line pressure was reduced by 34 psi.

Test #5—Progressing Cavity Pump Test

This well was a high performance, high producing well, continuously running at 330 RPM's at an 80% electrical load factor. The well received a 14% reduction in Daily Peak Torque, a 6% drop in Motor Torque, and a 15% drop in Kilo Watt Hours immediately after treatment was initiated. Once the well treatment was terminated, the well returned to its previous levels 26 hours later, emphasizing the importance of daily treatment.

The treatment procedure included mixing 105 gallons of polarized lubricant with 9 parts water to create the diluted lubricant. The production line U-Tubed to provide treatment circulation. Treatment fluid was introduced down the suction side or back side of the production tubing by a large pump truck using a pump at 1400 psi pushing the treatment lubricant fluid to the production zone. The well was turned back on and forced to re-circulate for 12 hours mixing the lubricant with the production fluid, and performing a substantially full and radial coating of thin bonded lubricant film to all metal surfaces. The well was then shut off, the hoses were removed, and the production line re-opened and the well turned back on line again. Daily treatments of 5 gallons of polarized lubricant were introduced as one batch treatment every 24 hours.

The positive changes in Key Performance Indicators were as follows: (1) Daily Peak Torque was reduced by 14%; (2) Motor Average Torque was reduced by 6%; (3) Kilo Watt Hours were reduced by 2.9, or 15%; and (4) Well production increased with no increase of RPM's Test #6—Roto-Flex Rod Pump Test This well had failed and rod and tubing was replaced 3 times in the prior 45 days due to high friction of rod and tubing. This was a large rod pump with a Variable Speed Drive (VSD) that was operating at very low speeds due to friction and drag. A VSD is a drive that will speed up or slow down automatically depending on friction and drag. This pump registered a rod load of over 51,000 lbs. with a pump speed of 1.4 strokes per minute due to the high amount of rod load and drag, making an average of 30 barrels per day over an 8-week history. After the lubrication treatment protocols were initiated, the flow line pressure was reduced by 25 psi, the rod load was reduced by 10,000 lbs. (20%), and the pump speed increased to 4.3 strokes per minute as a result of the reduction in resistance—or drag and friction, increasing the total production fluid volume to 160 barrels per day. This increase in production, along with the other favorable KPI's, operated successfully, without failure, at the new improved levels for the entire 30-day test period due to the reduced rod load, friction, and drag achieved by using our test lubricant fluid. Once the treatment stopped, the rod load and friction returned, the operating speeds and production volumes reduced to the pre-test levels, and the pump failed within 5 days due to rod on tubing friction.

The treatment procedure included mixing 110 gallons of polarized lubricant with 9 parts water to create the polarized lubricant. The well was shut down, and the production line was hose fed back into the well or U-Tubed to provide re-circulation. Furthermore, since the coiled rod was ready to be installed, the test operators also filled the tubing with diluted lubricant just before the rod was installed in the tubing to create some saturation before the circulation phase. Treatment fluid was introduced down the suction side or back side of the production tubing by a large pump truck using a pump at 2500 psi pushing the treatment lubricant fluid to the production zone. The well was turned back on and forced to re-circulate for 24 hours mixing the diluted lubricant with the production fluid, and performing a substantially full and radial coating of thin bonded lubricant film to metal surfaces. The well was then shut off and the production line re-opened and the well turned back on line again. Daily treatments of 55 gallons of pre-mixed diluted lubricant were introduced as one batch treatment every 24 hours.

The positive changes in Key Performance Indicators were as follows: (1) Rod load dropped 10,000 lbs from 50,000 lbs to 40,000 lbs or 20%; (2) Production speed increased from 1.3 SPM (strokes per minute) to 4.3 SPM; (3) Flow line pressure was reduced from 184 psi to 143 psi or 22%; (4) Production volume increased from 60 BPD to 160 BPD; and (5) Smoother operation, with no failures during the 30-day test period.

Test #7—Roto-Flex Rod Pump Test

This test was conducted on a 12,567 foot well with a high failure history, with the well having been recently changed over to a Roto-Flex unit to better handle the higher rod string load caused by the deviations in the well bore. Rod-on-tubing friction and rod load were believed to be causing well shut downs due to the upper limits being reached. Once treatment was initiated, the well saw an immediate increase in Strokes per Minute (SPM) from 1.3 to 3.2, an increase in production volume of 62 barrels a day. The flow line pressure was reduced by 35 psi, and the well ran smoothly for the 15-day test period. After treatment was terminated, the well was down for service in 11 days for rod parting.

The treatment procedure entailed mixing 110 gallons of polarized lubricant with 9 parts water. The well was shut down, and the well was U-Tubed to provide re-circulation. Treatment fluid was introduced down the suction side or back side of the production tubing by a large pump truck using a pump at 1400 psi pushing the treatment lubricant fluid to the production zone. The well was turned back on and forced to re-circulate for 8 hours mixing the lubricant with the production fluid, and performing a full and radial coating of thin bonded lubricant film to all metal surfaces. The production line re-opened and the well turned back on and on line again. Daily treatments of 5 gallons of polarized lubricant were introduced with water as one batch treatment every 24 hours.

The positive changes in Key Performance Indicators were as follows: (1) Rod load dropped from 34,000 lbs. to 25,000 lbs. or 36%; (2) Production speed increased from 1.3 SPM to 3.2 SPM; (3) Flow line pressure was reduced by 35 psi; (4) Production volume increased from 60 barrels per day to 132 barrels per day; and (5) Smoother operation with no failures during the test period.

Test #8—Electronic Submersible Pump (ESP) Test

This well did not have capillary string tubing, so treatment protocols called for treatment of 115 gallons of polarized lubricant mixed with water pushed down the backside, or fluid path. The goal was to reduce the high friction and drag caused by the individual chambers and by solids deposition. The well's tubing pressure was also high, reading at 286 psi before treatment. Once treated, the tubing pressure was reduced to 190 psi, a 34% reduction, and the friction was reduced, as evidenced by a drop in the amperage draw of 19%.

The treatment procedure entailed mixing 115 barrels of polarized lubricant with water to produce diluted lubricant, pushed down the backside casing. The well was U-Tubed to provide re-circulation. Diluted lubricant was introduced down the suction side or back side of the production tubing by a large pump truck using a pump at 1,400 psi pushing the treatment lubricant fluid to the production zone. The well was turned back on and forced to re-circulate for 12 hours mixing the diluted lubricant with the production fluid, and performing a substantially full and radial coating of thin bonded lubricant film to all metal surfaces. The production line re-opened and the well turned back on and on line again. Daily treatments of 4 gallons of polarized lubricant mixed with water were introduced as one batch treatment every 24 hours.

The positive changes in Key Performance Indicators were as follows: (1) Heat signature of pump dropped by 15 degrees Fahrenheit; (2) Electrical load dropped by 18%; (3) Flow line pressure was reduced from 286 psi to 190 psi or 34%; and (4) Production volume increased slightly.

Test #9—Electronic Submersible Pump (ESP) Test 180 gallons of polarized lubricant mixed with water as a treatment was initiated on Day 1, followed up by a daily batch dosage of 5 gallons of polarized lubricant e mixed with water. The high friction down hole between the chambers was reduced, as the amperage draw was decreased by 17%, which held constant for the duration of the test. The tubing pressure was decreased by 20%, from 320 psi to 256 psi, allowing for increased laminar flow and increased production of 12% per day.

The treatment procedure entailed flushing 18 gallons of polarized lubricant down the back side casing. The production line was hose fed back into the well or U-Tubed to provide re-circulation. The well was turned back on and forced to re-circulate for 12 hours mixing the lubricant with the production fluid, and performing a substantially full and radial coating of thin bonded lubricant film to all metal surfaces. The well was then shut off, the hoses were removed, and the production line re-opened and the well turned back on and on line again. Daily treatments of 4 gallons of polarized lubricant were introduced as one batch treatment every 24 hours.

The positive changes in Key Performance Indicators were as follows: (1) Heat signature of pump dropped by 12 degrees Fahrenheit; (2) Electrical load dropped by 12%; (3) Flow line pressure was reduced by 18%; and (4) Production volume increased slightly.

The above tests demonstrate a repeatability of results evidenced by repeated positive changes in the key performance indicators in various production well types.

What is claimed is:

1. A method of lubricating an oil production pump, the method comprising the steps of:
   providing a polarized lubricant including an emulsifier and a polar compound, and water for diluting the polarized lubricant to produce a diluted lubricant, wherein a volume ratio of water to polarized lubricant being in the range of 3:1 to 7:1;
   circulating a mixture of the diluted lubricant into a flow path of the oil production pump so that the diluted lubricant reacts with components of the oil production pump and forms a protective barrier on the components of the oil production pump;
   operating the oil production pump to pump out oil from a ground.

2. The method of claim 1 wherein the providing step comprises a step of providing a polarized lubricant being an ionic positive charge including an emulsifier and a polar compound, and water for diluting the polarized lubricant to produce a diluted lubricant, wherein a volume ratio of water to polarized lubricant being in the range of 3:1 to 7:1.

3. The method of claim 1 wherein a second operating step is performed before the circulating step.

4. The method of claim 1 wherein
   the polarized lubricant is formed from a plant based fluid.

5. The method of claim 4, wherein the plant based fluid includes one of: grape seed oil, canola oil, sunflower oil, and soybean oil.

6. The method of claim 4, wherein the polarized lubricant is of an ionic positive charge.

* * * * *